A. H. McRONALD & I. DANIELS.
MACHINE FOR PREPARING SPRUCE GUM FOR THE MARKET.
APPLICATION FILED NOV. 23, 1912.

1,093,451.

Patented Apr. 14, 1914.

Witnesses:
B. M. Newell.
C. B. Creighton.

Inventors
Adelbert H. McRonald
Isaac Daniels
by S. W. Bates
Atty.

UNITED STATES PATENT OFFICE.

ADELBERT H. McRONALD, OF PORTLAND, MAINE, AND ISAAC DANIELS, OF BOONVILLE, NEW YORK; SAID McRONALD ASSIGNOR, BY MESNE ASSIGNMENTS, TO SAID DANIELS.

MACHINE FOR PREPARING SPRUCE-GUM FOR THE MARKET.

1,093,451.  Specification of Letters Patent.  Patented Apr. 14, 1914.

Application filed November 23, 1912. Serial No. 733,039.

*To all whom it may concern:*

Be it known that we, ADELBERT H. McRONALD and ISAAC DANIELS, of Portland, Cumberland county, State of Maine, and Boonville, Oneida county, State of New York, respectively, have invented certain new and useful Improvements in Machines for Preparing Spruce-Gum for the Market, of which the following is a specification.

Our invention relates to an apparatus or machine for converting natural spruce gum into marketable form in imitation of the form in which it comes from the tree.

The material to which our invention is applied is natural spruce gum which is cleaned and melted into a mass at the locality where it is bought and which it is desired to put into suitable form for marketing in simulation of the natural drops as they form on the tree and the object of our invention is to devise an apparatus for doing this work.

The invention consists of the mechanism hereinafter described and claimed for melting the gum and converting it into drops similar to those which form naturally on spruce trees.

We have illustrated our invention by means of the accompanying drawing, in which is shown a machine designed to transform the crude gum into marketable form.

Figure 1:
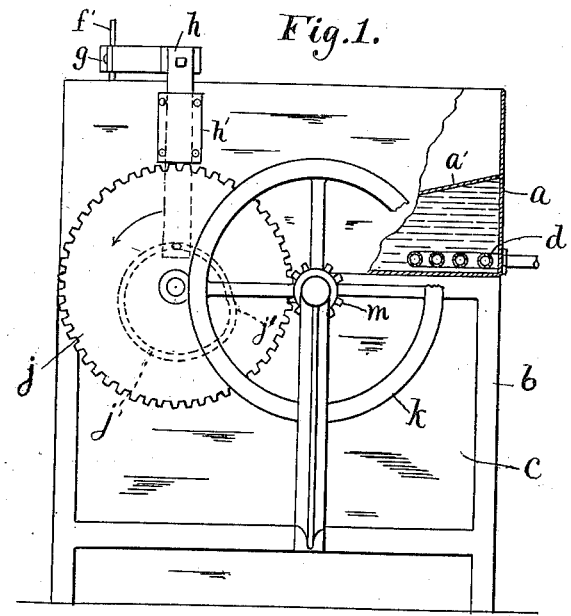
Figure 2:
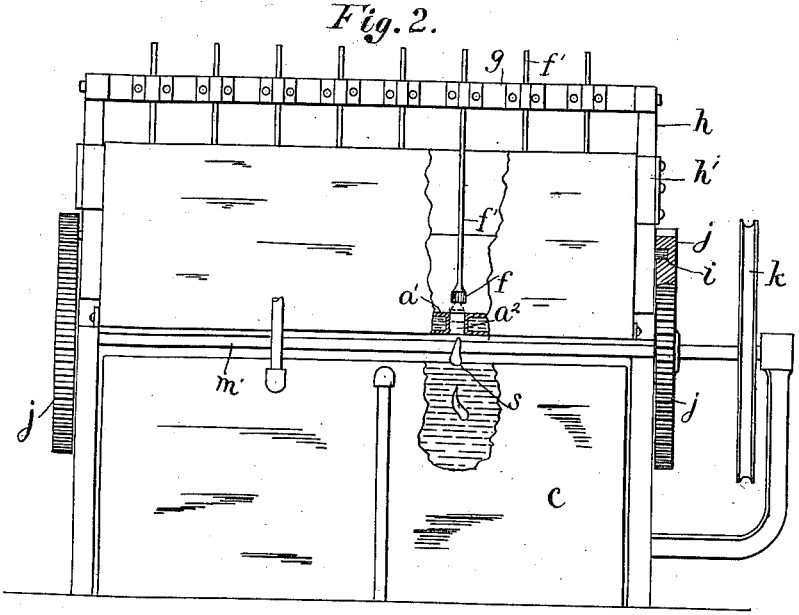

In the drawing, Figure 1 is an end elevation showing a portion in section, and Fig. 2 is a front elevation with a portion in section.

In the drawing, $a$ represents the gum tank for containing the melted gum, this tank having a sloping diaphragm or false bottom $a'$ forming a water jacket at the lower portion of the tank. The water jacket is filled with water and the water is heated by a steam coil $d$.

The drops are formed by forcing small portions of the melted gum through a series of small cylinders $a^2$ arranged in a line along the front of the tank at its lowest point. Co-acting with these cylinders are plungers $f$ which are given a vertical motion into and out of the cylinders by suitable mechanism hereinafter described. The plungers have a limit of motion from a point some distance above the upper ends of the cylinders to a point at or near the lower ends, so that as they reciprocate they force successive portions of the melted gum downward through the cylindrical openings. The plungers $f$ have spindles $f'$ extending upward and connecting with a cross head $g$ fixed to the upper ends of two vertical standards $h$. These standards have a vertical movement in guides $h'$ fixed on the ends of the machine and the movement corresponds to the movement of the plungers in the cylinders. The movement of the standards and the plungers is governed by the cam roll $i$ fixed to the standard and running in the cam path in the gear cam $j$, the path $j'$ being indicated by dotted lines in Fig. 2. The path is of such shape that the plunger will be given a downward motion from its upper position above the upper end of the cylinder steadily descending to a point at or near the lower end of the cylinder and thence upward to a point within the cylinder indicated by dotted lines in Fig. 2. At this point the plunger takes a sudden start upward thereby producing a vacuum in the cylinder and tending to break away the residue of gum left in the cylinder from that contained in the drop and to limit the length of the tail or end which comes off with the drop. Motion is imparted to the gear cam $j$ by a driving pulley $k$ and pinion $m$ which engages the gear cam, the latter being secured to a shaft $m'$. It will be understood that there is a gear cam $j$ at each end of the tank each operating one of the standards and that two similar pinions $m$ are fixed on the shaft $m'$ for operating the cam gears.

For the purpose of catching the drops and setting them in the form in which they come from the machine we provide a tank of water $c$ beneath the gum tank and this water tank has a supply and an overflow pipe. The reciprocation of the gang of plungers forces successive quantities of melted gum down through the cylinders and elongated drops fall into the water where they immediately harden. The drops are subsequently taken from the water and tumbled in any well known manner so as to break off the small tips which tend to form when the drops separate from the mass. The product resulting from these operations is a drop of natural spruce gum which has a very close resemblance to the natural drop as it comes from the tree in its best form.

There is a variety of shapes to the different drops so that they do not resemble artificially molded pieces.

We claim:—

1. A machine for forming natural spruce gum into marketable form consisting of a heated gum tank for containing the gum, said tank having a series of normally unobstructed cylindrical openings through its bottom, a series of vertically movable plungers fitting said openings and movable to a point above the upper ends of said openings and a water tank beneath said gum tank and separated therefrom.

2. A machine for forming natural spruce gum into marketable form consisting of a heated gum tank for containing the melted gum, a series of drop forming cylinders in the bottom thereof, a series of vertically movable plungers fitting said cylinders and means for forcing said plungers downward through said cylinders from a point above their upper ends, thence lifting the plungers to a point within the cylinders and then checking their speed and finally raising them with a quick motion whereby each discharged drop of gum is severed from the residue left in the cylinders, and a water tank beneath the gum tank.

In testimony whereof we have affixed our signatures, in presence of two witnesses.

ADELBERT H. McRONALD.
ISAAC DANIELS.

Witnesses to A. H. McR.:
S. W. BATES,
CORA B. CREIGHTON.

Witnesses to I. D.:
GEO. E. RENDELL,
HARRIET WILLIAMS.

Copies of this patent may be obtained for five cents each, by addressing the "Commissioner of Patents, Washington, D. C."